(12) United States Patent
Weston et al.

(10) Patent No.: US 12,668,483 B2
(45) Date of Patent: Jun. 30, 2026

(54) VEHICLE FLUID FILL SPECIFICATION AND CAPACITY COMMUNICATION

(71) Applicant: FORD GLOBAL TECHNOLOGIES, LLC, Dearborn, MI (US)

(72) Inventors: Keith Weston, Canton, MI (US); Brendan Diamond, Grosse Pointe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 429 days.

(21) Appl. No.: 18/344,474

(22) Filed: Jun. 29, 2023

(65) Prior Publication Data

US 2025/0002328 A1     Jan. 2, 2025

(51) Int. Cl.
*B67D 7/74* (2010.01)
*G05D 11/13* (2006.01)

(52) U.S. Cl.
CPC ........... *B67D 7/744* (2013.01); *G05D 11/131* (2013.01); *B67D 2007/747* (2013.01)

(58) Field of Classification Search
CPC .......... B67D 7/744; B67D 7/04; B67D 7/145; B67D 7/74; B67D 7/0401; B67D 7/02; B67D 7/06; B67D 2007/747; B67D 2007/044; G05D 11/131; G07C 5/008; G07C 5/0808; H04W 4/44; H04W 4/46; H04W 4/80; H04W 84/12

USPC ......................................................... 700/239
See application file for complete search history.

(56) References Cited

U.S. PATENT DOCUMENTS

| | | | |
|---|---|---|---|
| 6,422,465 B2 | 7/2002 | Miller | |
| 10,163,141 B2 | 12/2018 | Fansler et al. | |
| 2016/0208764 A1* | 7/2016 | Mann | F02P 5/152 |
| 2018/0009651 A1 | 1/2018 | Payne et al. | |
| 2020/0393258 A1* | 12/2020 | Leone | G01C 21/3492 |

FOREIGN PATENT DOCUMENTS

WO      2019125752 A1      6/2019

* cited by examiner

*Primary Examiner* — Fawaad Haider
(74) *Attorney, Agent, or Firm* — Joseph Zane; Brooks Kushman P.C.

(57) ABSTRACT

Blending of available fluids for a vehicle is provided. It is received, to the vehicle from a fluid dispenser over a bidirectional filling communications session, information indicative of a plurality of available fluids for dispensing from the fluid dispenser into a fluid reservoir of the vehicle. It is indicated, from the vehicle over the bidirectional filling communications session to the fluid dispenser, a first quantity of a first fluid and a second quantity of a second fluid to be dispensed to the vehicle as a blend. It is received the first quantity of the first fluid and the second quantity of the second fluid into the fluid reservoir of the vehicle.

21 Claims, 6 Drawing Sheets

100

200

600

Network Device — 608

Input Device — 612

Processor — 604

Output Device — 610

Storage — 606

Computing Device
602

VEHICLE FLUID FILL SPECIFICATION AND CAPACITY COMMUNICATION

TECHNICAL FIELD

Aspects of the disclosure relate to communication of fluid specifications and fill capacities between vehicles and fluid dispensers.

BACKGROUND

Tools and filling devices for fluids have the ability to provide multiple fluids and fill capacities. For instance, a gas station may offer diesel, ethanol, and different grades of gasoline. In addition to gasoline, example fluids may include radiator fluid, engine oil, transmission fluid, air, and nitrogen.

SUMMARY

In one or more illustrative examples, a method for blending of available fluids for a vehicle is performed. Information is received, to the vehicle from a fluid dispenser over a bidirectional filling communications session, indicative of a plurality of available fluids for dispensing from the fluid dispenser into a fluid reservoir of the vehicle. From the vehicle over the bidirectional filling communications session to the fluid dispenser, a first quantity of a first fluid and a second quantity of a second fluid to be dispensed to the vehicle as a blend is indicated. The first quantity of the first fluid and the second quantity of the second fluid are received into the fluid reservoir of the vehicle.

In one or more illustrative examples, a system for blending of available fluids for a vehicle, includes a vehicle configured to establish a bidirectional filling communications session between a controller of the vehicle and a dispenser communicator of a fluid dispenser. The vehicle executes a fluid monitor to perform operations including to receive, to the vehicle from the fluid dispenser over the bidirectional filling communications session, information indicative of a plurality of available fluids for dispensing from the fluid dispenser into a fluid reservoir of the vehicle; indicate, from the vehicle over the bidirectional filling communications session to the fluid dispenser, a first quantity of a first fluid and a second quantity of a second fluid to be dispensed to the vehicle as a blend; and receive the first quantity of the first fluid and the second quantity of the second fluid into the fluid reservoir of the vehicle.

In one or more illustrative examples, a non-transitory computer-readable medium comprising instructions for blending of available fluids for a vehicle that, when executed by one or more controllers of the vehicle, cause the vehicle to perform operations including to establish a bidirectional filling communications session between the one or more controllers of the vehicle and a dispenser communicator of a fluid dispenser, the vehicle executing a fluid monitor to perform operations including to receive, to the vehicle from the fluid dispenser over the bidirectional filling communications session, information indicative of a plurality of available fluids for dispensing from the fluid dispenser into a fluid reservoir of the vehicle; indicate, from the vehicle over the bidirectional filling communications session to the fluid dispenser, a first quantity of a first fluid and a second quantity of a second fluid to be dispensed to the vehicle as a blend; and receive the first quantity of the first fluid and the second quantity of the second fluid into the fluid reservoir of the vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles may require the filling or changing of various fluids. These fluids may include radiator fluid, engine oil, transmission fluid, gasoline, diesel, air, and nitrogen. In one example, fuel pumps offer multiple grades of fuel from the same nozzle, where the user is required to select an appropriate fuel grade for refueling the vehicle. In another example, a vehicle may have requirements for engine oil weight and fill level. In yet another example, vehicle tires may have a recommended air pressure for inflation.

Proper fluid selection and filling of the proper fluid to the proper fill capacity are important aspects of vehicle operation and maintenance. In some cases, using an improper fluid may impair or prevent vehicle operation. For instance, if diesel fuel is used to fill a gasoline vehicle, the gasoline vehicle may be unable to function until the incorrect fuel is removed. Or, if the incorrect weight or quantity of oil is added to the vehicle, the engine may perform sub-optimally or may require repair.

A vehicle specification communication system for fluid specifications and fill capacities may be provided. The system may be utilized to ensure the proper capacity and type of fluids are added to the vehicle. The communication system may identify fluid levels and properties, and may share that information with a fluid dispenser that is being used to adjust the fluid level of the vehicle. By sharing the information, the correct fluid selection and fill level may be ensured. In addition, a controllable shutoff and/or fluid blending system may be implemented. Further aspects of the disclosure are discussed in detail herein.

Figure 1:
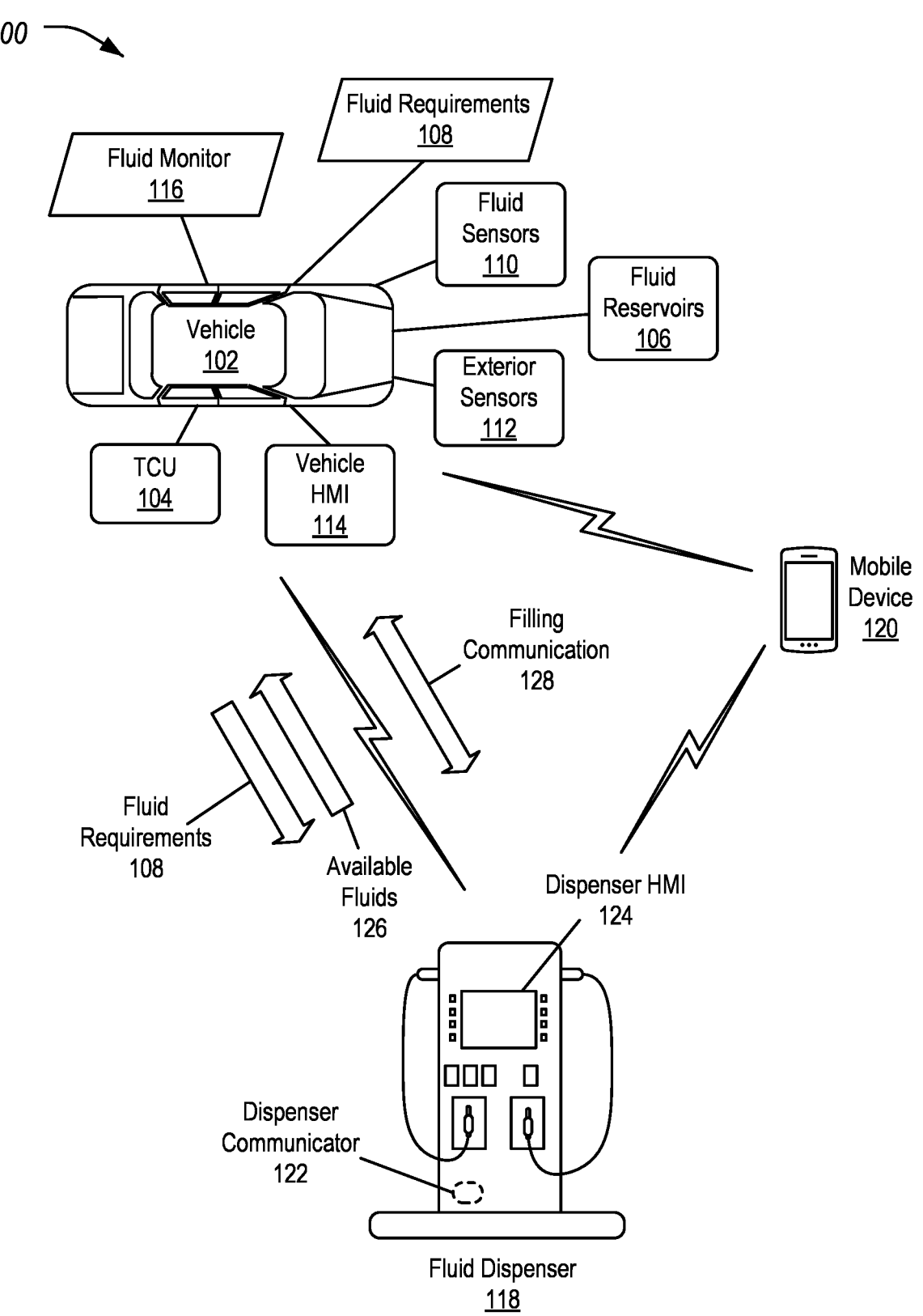
FIG. 1 illustrates an example vehicle fluid communication system for communication of fluid specifications and fill capacities for vehicles for enhanced fluid filling.

FIG. 1 illustrates an example vehicle fluid communication system 100 for communication of fluid specifications and fill capacities for vehicles 102 for enhanced fluid filling. The vehicle fluid communication system 100 includes a vehicle 102 having various fluid requirements 108 for the proper operation of the vehicle 102. The vehicle 102 may include components such as a telematics control unit (TCU) 104, fluid sensors 110, exterior sensors 112, a vehicle human machine interface (HMI) 114, and a fluid monitor 116. The vehicle fluid communication systems 100 also includes one or more fluid dispensers 118. In some examples, the vehicle fluid communication system 100 may further include a mobile device 120 to aid in the operation of the vehicle 102 with the fluid dispenser 118. The fluid dispenser 118 may include components such as a dispenser communicator 122 and a dispenser HMI 124. It should be noted that the vehicle fluid communication system 100 is only an example, and more, fewer, and/or different components may be used.

The vehicle 102 may include various types of automobile, crossover utility vehicle (CUV), sport utility vehicle (SUV), truck, recreational vehicle (RV), boat, plane or other mobile machine for transporting people or goods. In some cases, the vehicle 102 may be powered by an internal combustion engine. In other cases, the vehicle 102 may be a battery electric vehicle (BEV) powered by a traction battery and one or more electric motors. As a further possibility, the vehicle 102 may be a hybrid electric vehicle powered by both an internal combustion engine, a traction battery, and one or more electric motors. Hybrid vehicles 102 may come in various forms, such as a series hybrid electric vehicle, a parallel hybrid electrical vehicle, or a parallel/series hybrid electric vehicle. As the type and configuration of vehicle 102 may vary, the capabilities and fluid requirements 108 for the proper operation of the vehicle 102 may vary. For title, inventory, and other purposes, vehicles 102 may be associated with unique identifiers, such as vehicle identification numbers (VINs), globally unique identifiers (GUIDs), customer or fleet accounts, etc.

The vehicle 102 may include a plurality of components configured to perform and manage various vehicle 102 functions under the power of the vehicle battery and/or drivetrain. As depicted, the example vehicle components are represented as discrete controllers (e.g., the TCU 104, the fluid sensors 110, the exterior sensors 112, the vehicle HMI 114, etc.). However, the components of the vehicle 102 may share physical hardware, firmware, and/or software, such that the functionality from multiple controllers may be integrated into a single controller, and that the functionality of various such controllers may be distributed across a plurality of controllers.

The vehicle 102 may utilize the TCU 104 for communication. The TCU 104 may include network hardware configured to facilitate communication between the vehicle 102 and other devices of the vehicle fluid communication system 100. For example, the TCU 104 may include or otherwise access a cellular modem configured to facilitate communication with a communications network. The communications network may include one or more interconnected communication networks such as the Internet, a cable television distribution network, a satellite link network, a local area network, and a telephone network, as some non-limiting examples. In another example, the TCU 104 may support local communication with infrastructure, such as the fluid dispenser 118. This communication may be performed over protocols such as Wi-Fi, BLUETOOTH, Bluetooth Low Energy (BLE), and/or ultra-wideband (UWB), as some non-limiting examples.

The vehicle 102 includes various fluid reservoirs 106. These fluid reservoirs 106 may be configured to store the various fluids that are used by the vehicle 102. For instance, the vehicle 102 may have reservoirs to hold fuel, air (e.g., the tires), coolant, washer fluid, transmission fluid, etc. It should be noted that in some examples the fluid reservoir 106 may take the form of a tank, while in other cases the fluid reservoir 106 may refer to the overall capacity of the system that uses the fluid.

The fluid requirements 108 may indicate the types, fill levels, and other aspects of the fluids to be added to the fluid reservoirs 106 for the proper operation of the vehicle 102. The fluid requirements 108 may include information such as a minimum, maximum, and/or suggested octane of fuel for the vehicle 102, maximum allowable ethanol content for fuel of the vehicle 102, minimum, maximum, and/or suggested air pressure for the tires of the vehicle 102, preferred types of coolant, washer fluid, transmission fluid for the vehicle 102, minimum, maximum, and/or suggested weights of oil for the vehicle 102, etc.

The fluid requirements 108 may be stored to the vehicle 102 in a memory or other storage. For instance, the fluid requirements 108 may be stored to the TCU 104, to another controller of the vehicle 102, to a flash memory or other device accessible by the vehicle 102, etc. In another example, fluid requirements 108 may be encoded in a sticker such as a barcode affixed to the vehicles 102. As some non-limiting examples, oil requirements may be provided on a barcode affixed to the oil fill cap, fuel requirements may be provided on a barcode affixed to the fuel door, and tire pressure requirements may be provided on label affixed to the door jamb of the vehicle 102.

The fluid sensors 110 may include various equipment configured to monitor fluid levels of the vehicle 102 and ensure optimal operation of the vehicle 102. In an example, the fluid sensors 110 may include a fuel level sensor located in the fuel tank and configured to measure the amount of gasoline or diesel fuel present. In another example, the fluid sensors 110 may include an engine oil level sensor in the oil pan or on the side of the engine block and configured to measure the oil level. In yet another example, the fluid sensors 110 may include an engine coolant level sensor in the coolant reservoir or the radiator configured to monitors the level of engine coolant. As another example, the fluid sensors 110 may include a washer fluid level sensor responsible for monitoring the level of washer fluid in the reservoir. In yet another example, the fluid sensors 110 may include a transmission fluid level sensor located in the transmission pan to measure the level and condition of the transmission fluid. As still another example, the fluid sensors 110 may include a brake fluid level sensor configured to monitor the brake fluid level in the master cylinder or brake fluid reservoir 106. These fluid sensors 110 may operate in conjunction with the controllers of the vehicle 102 to provide real-time information about fluid levels and/or quality. For example, the fluid sensor 110 may allow for the vehicle 102 to verify the fluids of the vehicle 102 based on the fluid requirements 108.

The exterior sensors 112 may be utilized by the vehicle 102 to receive information about the surroundings of the vehicle 102. In an example, these exterior sensors 112 may include one or more of cameras (e.g., advanced driver-assistance system (ADAS) cameras), ultrasonic sensors, radar systems, and/or lidar systems.

The vehicle HMI 114 may be configured to provide an interface through which the vehicle 102 occupants may interact with the vehicle 102. The interface may include a touchscreen display, voice commands, and physical controls such as buttons and knobs. The vehicle HMI 114 may be configured to receive user input via the various buttons or other controls, as well as provide status information to a driver, such as fuel level information, engine operating temperature information, and current location of the vehicle 102. The vehicle HMI 114 may be configured to provide information to various displays within the vehicle 102, such as a center stack touchscreen, a gauge cluster screen, etc. The vehicle HMI 114 may accordingly allow the vehicle 102 occupants to access and control various systems such as navigation, entertainment, and climate control.

The fluid monitor 116 may be configured to maintain information with respect to the proper fluid selection and fill capacities for the fluids of the vehicle 102. The fluid monitor 116 may also configured to monitor the fluid levels of the various fluids of the vehicle 102 using the fluid sensors 110. The fluid monitor 116 may also be configured to interact with the fluid dispenser 118 to control the dispensing of fluid, as explained in further detail below.

The mobile device 120 may be any of various types of portable computing device, such as cellular phones, tablet computers, smart watches, laptop computers, portable music players, or other devices having processing and communications capabilities. The mobile device 120 may include one or more processors configured to execute computer instructions, and a storage medium on which the computer-executable instructions and/or data may be maintained.

The fluid dispenser 118 may be a device configured to provide one or more fluids to the vehicle 102. In one example, the fluid dispenser 118 may be a fuel dispenser configured to dispense or more types of fuel (e.g., gasoline of various octanes, ethanol, diesel, propane, hydrogen, etc.) into a fluid reservoir 106 of the vehicle 102. In other examples, the fluid dispenser 118 may be configured to dispense other fluids, such as engine oil, engine coolant, washer fluid, transmission fluid, brake fluid, etc.

The dispenser communicator 122 may include one or more devices configured to facilitate communication between the vehicle 102 and the fluid dispenser 118. In one example, the dispenser communicator 122 may be a wireless transceiver, such as a BLUETOOTH or Wi-Fi transceiver configured to communicate with the TCU 104 of the vehicle 102. In another example, the dispenser communicator 122 may be a camera configured to read a barcode affixed to the vehicle 102, such as on an oil fill cap, fuel door, tire pressure label, etc.

In yet another example, the dispenser communicator 122 and the vehicle 102 may be configured to communicate indirectly, such as via the mobile device 120. For example, the mobile device 120 may be configured to communicate with the TCU 104 of the vehicle 102 and with the wireless transceiver of the fluid dispenser 118 over various protocols, such as BLUETOOTH, Wi-Fi, cellular, etc. Or the mobile device 120 may facilitate indirect communications, such as displaying a barcode of information about the vehicle 102, which may then be read by a camera of the fluid dispenser 118.

The dispenser HMI 124 may include various controls that allow for the operation of the fluid dispenser 118 by a user. In the example of a fuel dispenser, the dispenser HMI 124 may include controls such as buttons to select the type and/or grade of fuel to be dispensed, payment controls, and displays to indicate the price per unit of fluid, the quantity of fluid being dispensed, and the charge for the dispense of the fluid.

The fluid monitor 116 may be configured to interact with the fluid dispenser 118 to control the dispensing of fluid. In an example, the fluid monitor 116 may provide the fluid requirements 108 to the fluid dispenser 118 to allow the fluid dispenser 118 to determine which of available fluids 126 that may be dispensed by the fluid dispenser 118 are suggested to be used with the vehicle 102. In an example, an indication of the suggested may be displayed to the user in the vehicle HMI 114 (or in other examples, in the dispenser HMI 124).

The fluid monitor 116 and the fluid dispenser 118 may also establish a bidirectional filling communications session 128. For example, the fluid monitor 116 and the fluid dispenser 118 may send commands and status to one another to automate the filling process. This may include, for instance, the fluid monitor 116 providing the fluid requirements 108 and current fluid level (or desired quantity of fluid) to the fluid dispenser 118, the fluid dispenser 118 providing an indication of the available fluids 126 and their respective pricing, and the fluid monitor 116 instructing the fluid dispenser 118 to dispense one or a blend of the available fluids 126. The fluid monitor 116 may also utilize the exterior sensors 112 to ensure that there is no spillage or other issue with the dispense.

Figure 2:
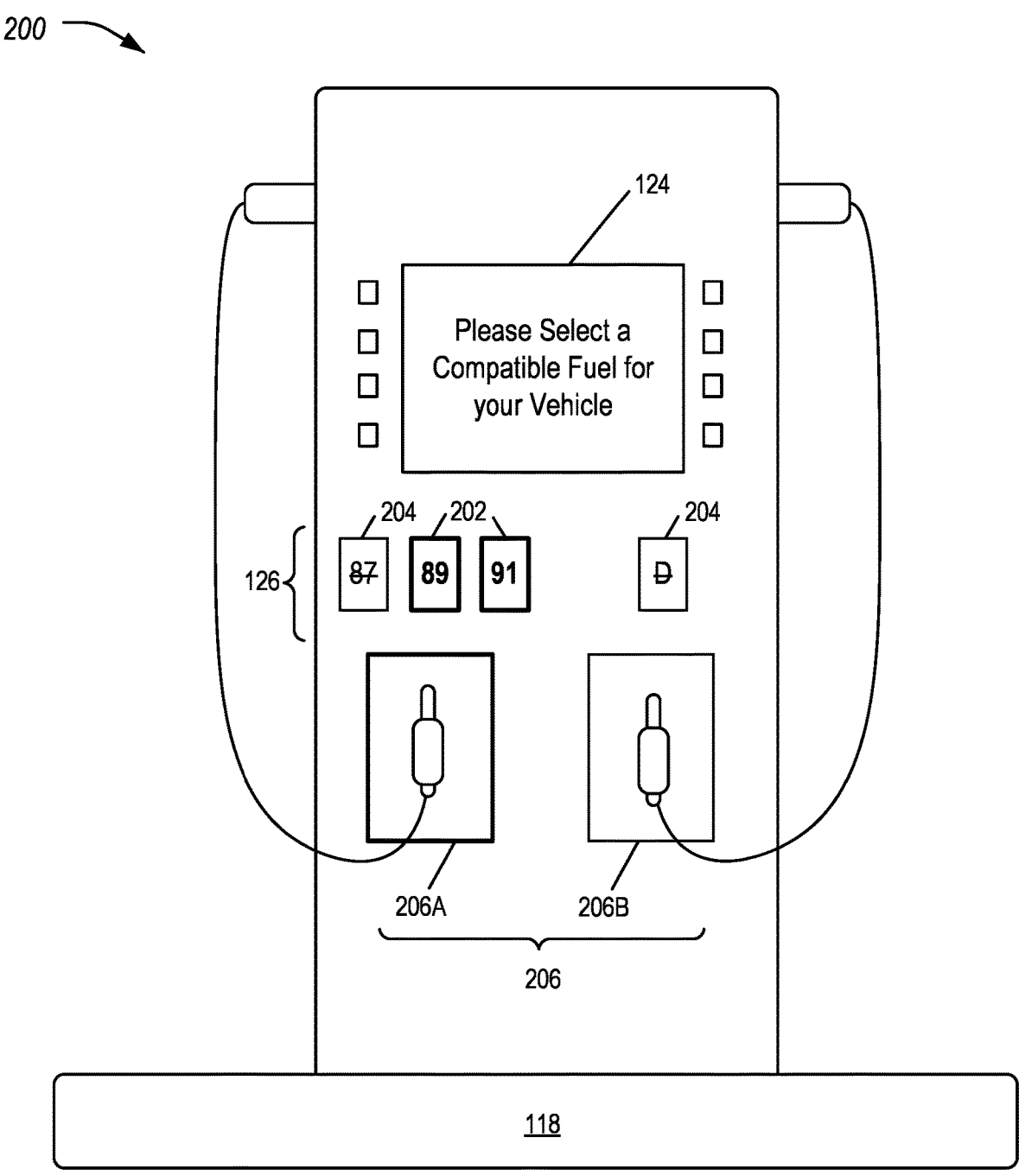
FIG. 2 illustrates an example of the fluid dispenser illustrating compatible fluids for the vehicle.

FIG. 2 illustrates an example 200 of the fluid dispenser 118 illustrating compatible fluids 202 for the vehicle 102. As shown, the dispenser HMI 124 indicates a message asking the user to select from the compatible fluids 202. These compatible fluids 202 may be indicated by the fluid dispensers 118 in various ways.

In an example, indications of the compatible fluids 202 may be illuminated or highlighted in the display of the compatible fluids 202. This allows the user to recognize which of the available fluids 126 are compatible fluids 202 with the vehicle 102. Additionally, or alternatively, the incompatible fluids 204 may be indicated or otherwise shown by the fluid dispenser 118. For instance, the incompatible fluids 204 may be shown as crossed out. Or, in another example, the compatible fluids 202 may be highlighted in a first color such as green, and the incompatible fluids 204 may be highlighted in a second color such as red.

In some examples, the fluid dispensers 118 may include multiple dispenser nozzles 206. As shown, the fluid dispenser 118 includes a first dispenser nozzle 206A and a second dispenser nozzle 206B. As the compatible fluids 202 may be dispensed from the first dispenser nozzle 206A, the first dispenser nozzle 206A may be illuminated or highlighted to allow the user to easily select the correct dispenser nozzle 206. Similarly, as no compatible fluid 202 can be dispensed from the second dispenser nozzle 206B in this example 200, the second dispenser nozzle 206B may be illustrated as unilluminated, or otherwise shown as not being compatible with the vehicle 102. For instance, the first dispenser nozzle 206A may be highlighted in a first color such as green, and the second dispenser nozzle 206B may be highlighted in a second color such as red.

In some examples, the fluid dispenser 118 may only allow the dispense of the compatible fluids 202, not the incompatible fluids 204. For instance, if the user wishes to select an incompatible fluid 204 (e.g., to fill up a portable gasoline tank), then the user may have to select to from the dispenser HMI 124 to override the restriction to only dispense compatible fluids 202 for the vehicle 102.

Figure 3:
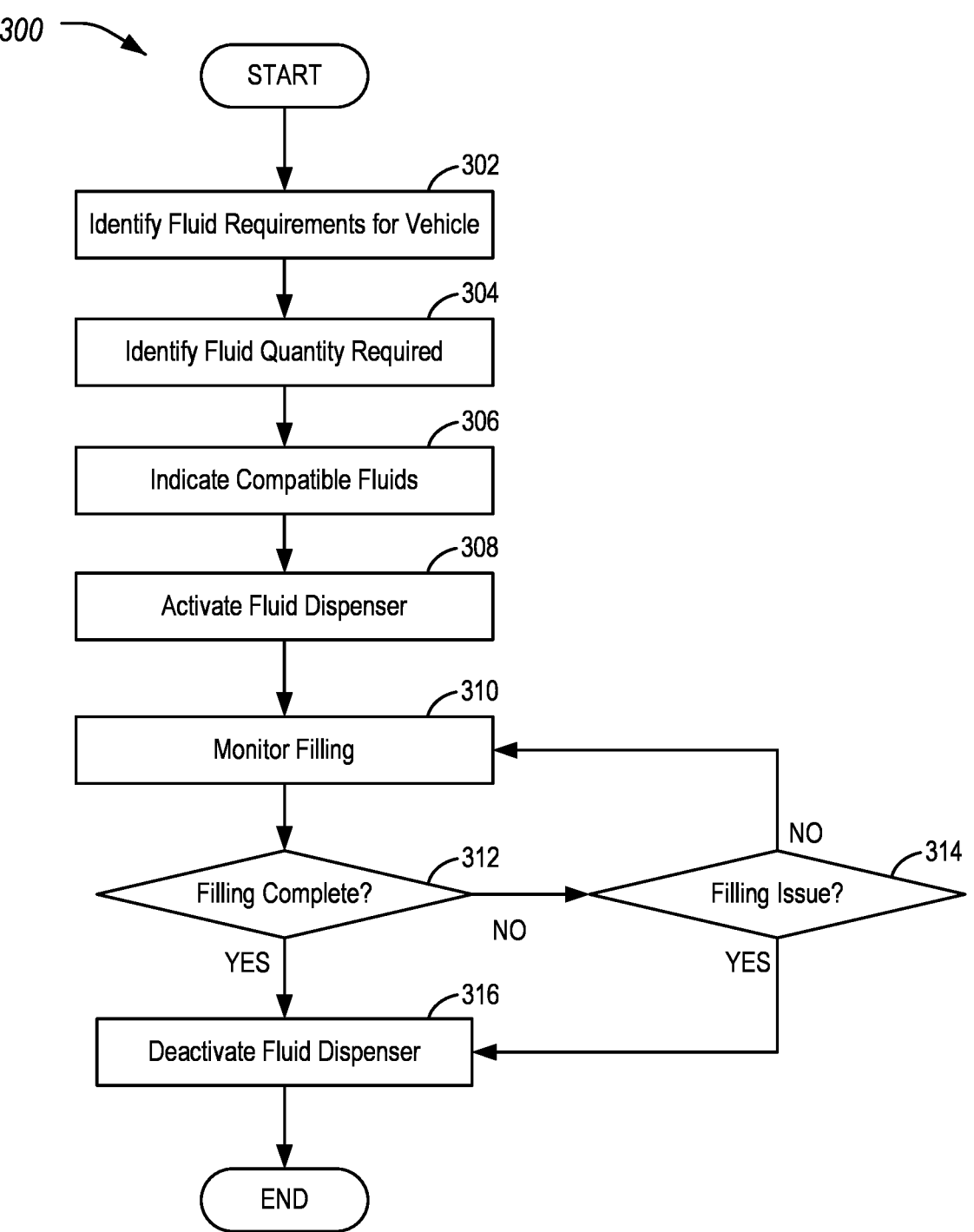
FIG. 3 illustrates an example process for the automated selection of a compatible fluid from the available fluids based on the fluid requirements of the vehicle.

FIG. 3 illustrates an example process 300 for the automated selection of compatible fluids 202 from the available fluids 126 based on the fluid requirements 108 of the vehicle 102. In an example, the process 300 may be performed by the fluid monitor 116 in communication with the fluid dispenser 118. For example, the process 300 may be performed with messaging through a bidirectional filling communications session 128 established between the TCU 104 and the dispenser communicator 122.

At operation 302, the fluid monitor 116 and/or the fluid dispenser 118 identify the fluid requirements 108 for the vehicle 102. The fluid requirements 108 may indicate the types, fill levels, and other aspects of the fluids required for the proper operation of the vehicle 102. In an example, the fluid monitor 116 may access the memory or storage of the vehicle 102 to electronically read the fluid requirements 108. In another example, the fluid dispenser 118 may utilize a camera or other sensor to read a barcode on the vehicle 102 encoding the fluid requirement 108. In yet another example, the mobile device 120 may display the barcode or may receive the fluid requirements 108 wirelessly from the vehicle 102 and send the fluid requirements 108 to the fluid dispenser 118.

At operation 304, the fluid monitor 116 and/or the fluid dispenser 118 identify a quantity of fluid required by the vehicle 102. In an example, the fluid monitor 116 may utilize fluid sensors 110 of the vehicle 102 to determine the current fluid levels in the fluid reservoir 106 to dispense into. The fluid sensors 110 may include various equipment configured to monitor fluid levels of the vehicle 102 and ensure optimal operation of the vehicle 102.

At operation 306, the fluid monitor 116 and/or the fluid dispenser 118 indicate compatible fluids 202 for the vehicle 102. In an example, the fluid monitor 116 and/or the fluid dispenser 118 may compute the compatible fluids 202 by comparing the available fluids 126 with the fluid requirements 108, and selecting those available fluids 126 that are a match to the fluid requirements 108. For example, if the fluid requirements 108 specify that the vehicle 102 requires unleaded gasoline of at least 89 octane, and if the available fluids 126 include 87 octane, 89 octane, 91 octane, and diesel, then the compatible fluids 202 may be found to be the 89 octane and 91 octane, and the incompatible fluids 204 may be found to be the 87 octane and the diesel. In another example, the fluid dispenser 118 may not allow ethanol to be dispensed for a vehicle 102 not equipped to run on ethanol.

At operation 308, the fluid monitor 116 and/or the fluid dispenser 118 activates the fluid dispenser 118. In an example, responsive to connection of the fluid dispenser 118 to the vehicle 102 and the selection of a compatible fluid 202, the fluid monitor 116 and/or the fluid dispenser 118 may begin the dispense operation into the fluid reservoir 106.

At operation 310, the fluid monitor 116 and/or the fluid dispenser 118 monitors the filling of the compatible fluid 202 to the fluid reservoir 106 of the vehicle 102. In an example, the fluid dispenser 118 may perform the dispense of the quantity of compatible fluid 202 identified at operation 304. In some examples, the fluid sensors 110 of the vehicle 102 may be used to track the level of fluid in the fluid reservoir 106.

At operation 312, the fluid monitor 116 and/or the fluid dispenser 118 determines whether filling is complete. For example, if the quantity of compatible fluid 202 identified at operation 304 has not yet been dispensed, control proceeds to operation 314. If, however, the quantity of compatible fluid 202 has been dispensed, control proceeds to operation 316.

At operation 314, the fluid monitor 116 and/or the fluid dispenser 118 determines whether a filling issue is detected.

In an example, the fluid monitor 116 may utilize exterior sensors 112 of the vehicle 102 to monitor to ensure that no spill has occurred. In another example, the fluid monitor 116 may utilize the fluid sensors 110 to ensure that the amount of compatible fluid 202 that is being dispensed by the fluid dispenser 118 is actually being received into the fluid reservoir 106 of the vehicle 102. If no issue is identified, control proceeds to operation 312. If an issue is identified, control proceeds to operation 316.

At operation 316, the fluid monitor 116 and/or the fluid dispenser 118 deactivates the fluid dispenser 118. This may be done if the dispense is completed, and/or if an issue occurs with the dispense. The dispenser HMI 124 and/or the vehicle HMI 114 may be utilized to display which condition occurred. For example, if the dispense is completed successfully, the dispenser HMI 124 and/or the vehicle HMI 114 may indicate the successful result. Or, if the dispense is interrupted, the dispenser HMI 124 and/or the vehicle HMI 114 may indicate the unsuccessful result. After operation 316, the process 300 ends.

Variations on the process 300 are possible. In an example, the vehicle 102 may communicate a desired pre-allocated amount of fluid at operation 304, as opposed to simply a quantity of fluid to fill up the vehicle 102. This desired amount may be based on factors such as a desired spend for the fluid, a desired quantity of the fluid (e.g., in gallons), a desired amount of vehicle 102 range to be added to the vehicle 102 (e.g., based on average fuel economy for the compatible fluid 202). These aspects may be received based on user input to the vehicle HMI 114 and/or to the dispenser HMI 124.

In many examples, the fluid dispenser 118 may only activate at or above the required fuel grade unless overridden by customer. In situations where vehicle manufacturer recommends a particular grade of fuel—the user may have a vehicle HMI 114 or mobile device 120 based option to override that recommendation, for example where the manufacturer recommends 91 octane fuel but the consumer wants to choose 87 octane fuel. If the customer selects a grade lower than the manufacturers recommendation, that information may be communicated back to the manufacturer to be used in warranty/service to aid in customer communication. For example, if the customer later complains of engine knock, the service advisor may explain that this may have been caused by use of a lower grade fuel and may also discuss when it was exhibiting the issue vs. when the customer decided to use the lower grade fuel.

Figure 4:
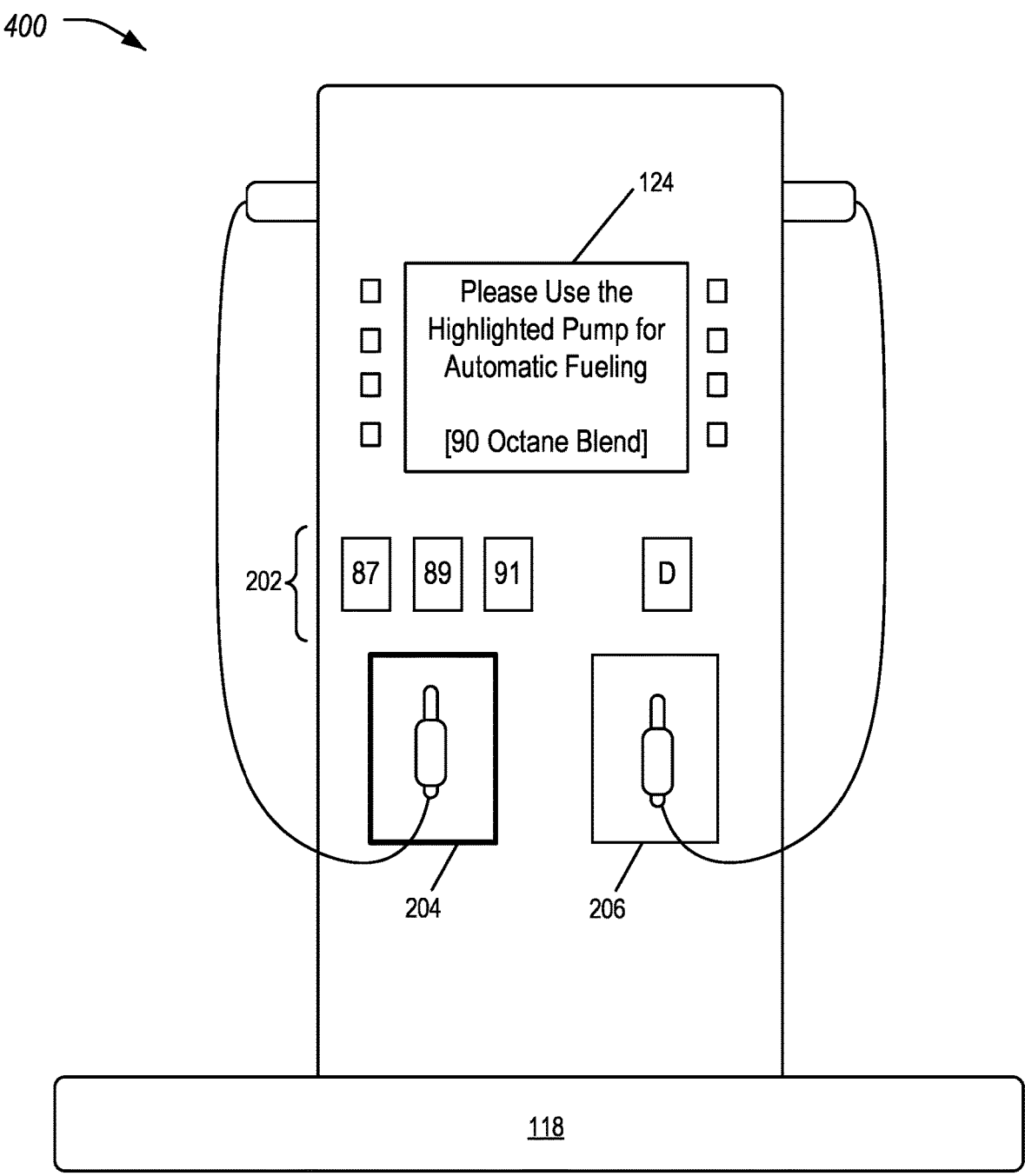
FIG. 4 illustrates an example of the fluid dispenser illustrating a blending of compatible fluids for the vehicle.

FIG. 4 illustrates an example 400 of the fluid dispenser 118 illustrating a blending of compatible fluids 202 for the vehicle 102. As shown, the dispenser HMI 124 indicates a message informing the user that a blended fueling is being performed. The fuel blending may involve a bidirectional filling communications session 128 between the vehicle 102 and the fluid dispenser 118 to enable a mixing of available fluids 126. This mixing may be performed as an optimization for the vehicle 102.

This optimization may be based on various user-specified or fleet-specified criteria. The criteria may include aspects such as fuel economy (e.g., to maximize miles/gallon or available distance to travel) and/or performance (e.g., to maximize horsepower, torque, towing capacity, etc.). For instance, as fuel economy varies by vehicle speed, terrain, temperature, etc., the speed and/or route of the vehicle 102 may be accounted for in the maximization. Further, in the fleet context, the overall spend, travel distance, etc., may be optimized across vehicles 102. In an example, it may overall benefit the fleet if premium fuel is supplied to a vehicle 102 with a longer route as opposed to a vehicle 102 with a shorter route, to allow the vehicle 102 with the longer route to complete the route without refueling.

In a more specific example, the blending may be performed to optimize for price and/or performance as compared to a selection of only a single of the available fluids 126. In an example, a blend may involve a mix of four gallons of 87 octane and four gallons of 91 octane to produce an 89 octane mix. This may be performed, for example, if the overall price for doing so is less expensive than that of choosing 89 octane (or perhaps there is no 89 octane fuel available at the fluid dispenser 118).

Or, a blend may be performed to indicate an octane level that is not available as a discrete available fluid 126. For instance, the vehicle 102 may require 90 octane fuel, but there is no 90 octane choice. The vehicle 102 may be fueled with 91 octane, but that may incur additional charges that are unnecessary. Instead, a blend may be dispensed that includes a mix of two gallons of 89 octane with two gallons of 91 octane, to provide the custom 90 octane blend for a lower outlay than using only 91 octane. As another possibility, two gallons of 87 octane and three gallons of 93 octane may be mixed to provide a custom 90.6 octane blend.

Figure 5:
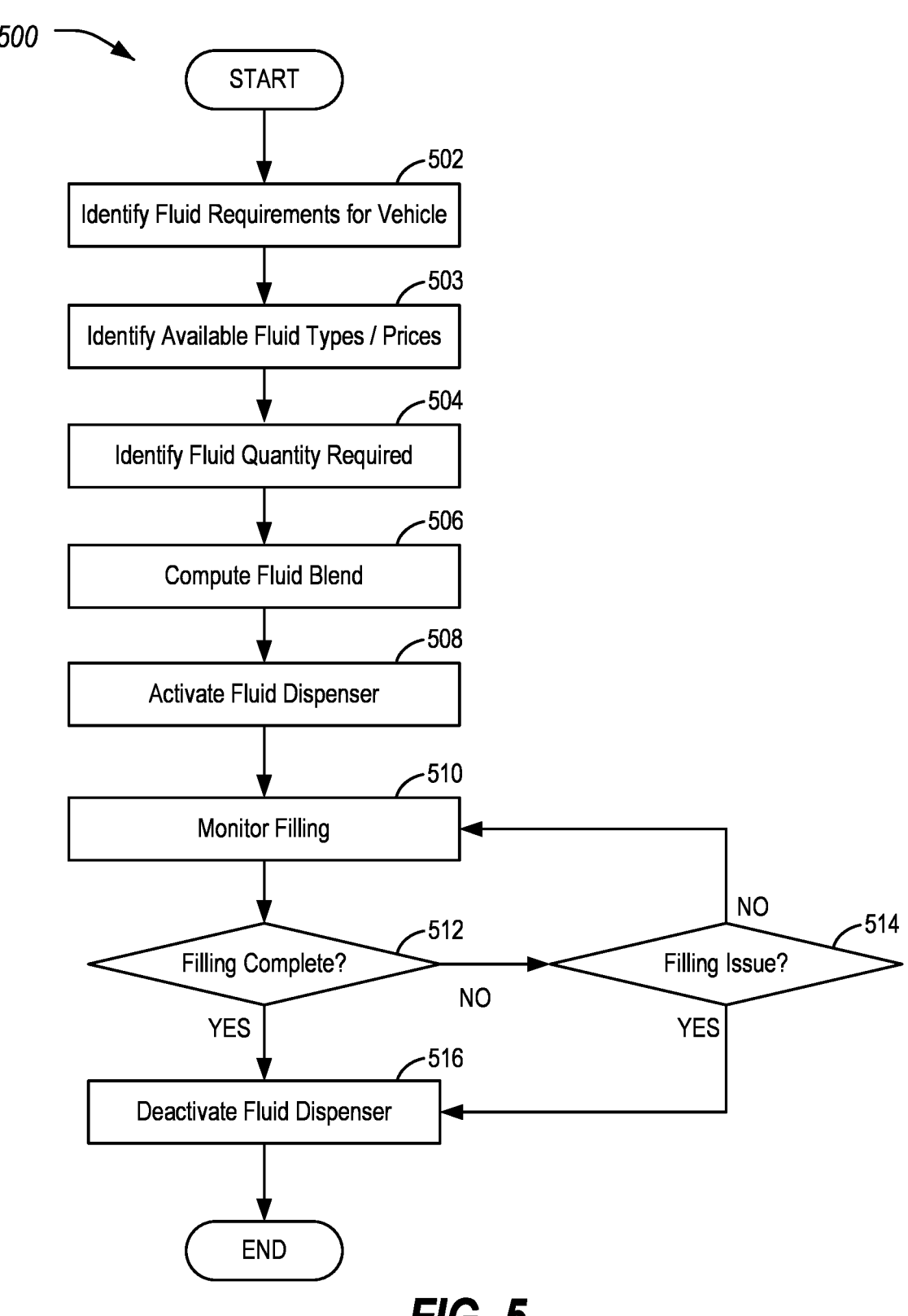
FIG. 5 illustrates an example process for the automated blending of the available fluids based on the fluid requirements of the vehicle.

FIG. 5 illustrates an example process 500 for the automated blending of the available fluids 126 based on the fluid requirements 108 of the vehicle 102. In an example, the process 500 may be performed by the fluid monitor 116 in communication with the fluid dispenser 118. For example, the process 500 may be performed with messaging through a bidirectional filling communications session 128 established between the TCU 104 and the dispenser communicator 122.

At operation 502, similar to operation 302, the fluid monitor 116 and/or the fluid dispenser 118 identify the fluid requirements 108 for the vehicle 102. At operation 503, the fluid monitor 116 and/or the fluid dispenser 118 additionally identifies the available fluids 126 as well as their prices. This information may be received from the fluid dispenser 118, in an example. At operation 504, similar to operation 304, the fluid monitor 116 and/or the fluid dispenser 118 identify a quantity of fluid required by the vehicle 102.

At operation 506, the fluid monitor 116 and/or the fluid dispenser 118 compute a fuel blend. The fuel blend may include quantities of two or more of the available fluids 126 that, when dispensed in combination, add up to the fluid quantity that is required. For example, the fluid monitor 116 and/or the fluid dispenser 118 may determine based on the available fluids 126 a desired blend or mix of two or more of the available fluid 126 to provide the desired quantity and properties.

In an example, the vehicle fluid communication system 100 may perform a fuel economy optimization, to allow the vehicle 102 to choose the correct octane level to minimize total fuel spend. For instance, based on historical fuel filling data from fluid dispensers 118, the vehicle 102 may track what octane fuel it is running on. Utilizing knock sensor data, environmental parameters, driving cycle data, load (gross train weight), throttle data, and other aspects that may be tracked by sensors of the vehicle 102, the vehicle fluid communication system 100 may develop a machine learning based optimization model for vehicle 102 performance and fuel economy. In an example, the vehicle 102 (and other vehicles 102) may utilize their respective TCUs 104 to send the aforementioned data elements to a cloud server for analysis. As one possibility, the cloud server may utilize a long short term neural network due to temporal nature of data acquisition to model the vehicle performance. Or, this information may be derived using vehicle-to-vehicle (V2V) communication based on many different vehicles 102 using different fuel grades and under different operating conditions.

Based on the engine parameters and vehicle 102 development or certification knowledge, the vehicle 102 may recommend adjustments in octane rating or fuel blending to optimize money spent on fuel vs fuel economy. For instance, the parameters may show that 91 octane vs. 89 octane results in 5% better fuel economy but incurs 10% more spend. Thus, the vehicle 102 may choose to blend fuel closer to 89 octane or to simply use 89 octane.

In some examples, the vehicle 102 may receive pricing information for the available fluids 126 from the fluid dispenser 118. Using this information, the vehicle 102 may estimate the fuel economy for each octane (or retrieve this information from the cloud server). The vehicle 102 may also determine the best octane to use, e.g., based on spend per mile driven. An example analysis is shown in Table 1. For each octane, the vehicle 102 can estimate a fuel economy based on historical data:

TABLE 1

| Per mile spend vs Fuel octane | | | |
|---|---|---|---|
| Fuel | Miles/Gallon | Price | Per Mile Spend |
| 87 octane | 15 | $3.20 | $0.200 |
| 89 octane | 17 | $3.20 | $0.188 |
| 91 octane | 17.5 | $3.40 | $0.194 |
| 93 octane | 17.6 | $3.80 | $0.216 |

Based on the example analysis, the vehicle 102 should choose 89 octane fuel.

The vehicle 102 may be configured perform the optimized fuel blending option to procure the fuel mix to provide optimal performance and a minimum spend on fuel based on fuel economy. In another example, the vehicle 102 may be configured into a performance mode such that the recommended fuel will be a fuel octane fix to minimize knock or other engine performance metrics and provide full performance. This performance mode optimization may be a higher octane or lower octane than otherwise might be recommended based on ambient air conditions (temperature/ humidity). Using this approach, the user can ensure the vehicle 102 is being dispensed the best performance and/or fuel economy per unit price of fuel.

In some examples, the optimization may be performed across a fleet of vehicles 102. This optimization may be based on various user-specified or fleet-specified criteria. For instance, the miles/per gallon for different vehicles vs different fuel octanes may be considered using a pool of available fuels. In an example, if N gallons of premium 93 octane are available, and the miles/gallon and per mile spend are available for the vehicles 102, then the vehicle fluid communication system 100 may compute a global optimization of which vehicles 102 should receive the premium fuel. If, for instance, the premium fuel benefits one vehicle 102 of the fleet to reduce its per-mile spend greater than the reduction to another vehicle 102 of the fleet, then the premium fuel may be allocated to the vehicle 102 giving the overall least spend. In some other examples, the criteria may additionally or alternately include aspects such as fuel economy (e.g., to maximize miles/gallon or available distance to travel) and/or performance (e.g., to maximize horsepower, torque, towing capacity, etc.). For instance, as fuel economy varies by vehicle speed, terrain, temperature, etc., the speed and/or route of the vehicle 102 may be accounted for in the maximization. Further, in the fleet context, the overall spend, travel distance, etc., may be optimized across vehicles 102. In an example, it may overall benefit the fleet if premium fuel is supplied to a vehicle 102 with a longer route as opposed to a vehicle 102 with a shorter route, to allow the vehicle 102 with the longer route to complete the route without refueling.

The process 500 may then proceed similar to as shown for the process 300. At operation 508, similar to operation 308, the fluid monitor 116 and/or the fluid dispenser 118 activates the fluid dispenser 118. At operation 510, similar to operation 310, the fluid monitor 116 and/or the fluid dispenser 118 monitors the filling of the compatible fluid 202 to the vehicle 102. At operation 512, similar to operation 312, the fluid monitor 116 and/or the fluid dispenser 118 determines whether filling is complete. At operation 514, similar to operation 314, the fluid monitor 116 and/or the fluid dispenser 118 determines whether a filling issue is detected. At operation 516, similar to operation 316, the fluid monitor 116 and/or the fluid dispenser 118 deactivates the fluid dispenser 118.

While many examples herein relate to refueling, it should be noted that the disclosed approaches may be useful for the filling of other fluids as well. In another possibility, engine oil filling may also utilize the disclosed approach. For example, fluid requirements 108 such as oil type (e.g., synthetic), oil weight (e.g., 5W30), oil capacity (e.g., 6 quarts) may be identified. An oil level fluid sensor 110 may be used to determine oil fill level. If no such sensor is present, the vehicle fluid communication system 100 may limit fill capacity received from an oil fluid dispenser 118 to a maximum capacity of the crank case and oil filter, such that the fluid dispenser 118 is instructed to discontinue filling beyond that quantity.

Figure 6:
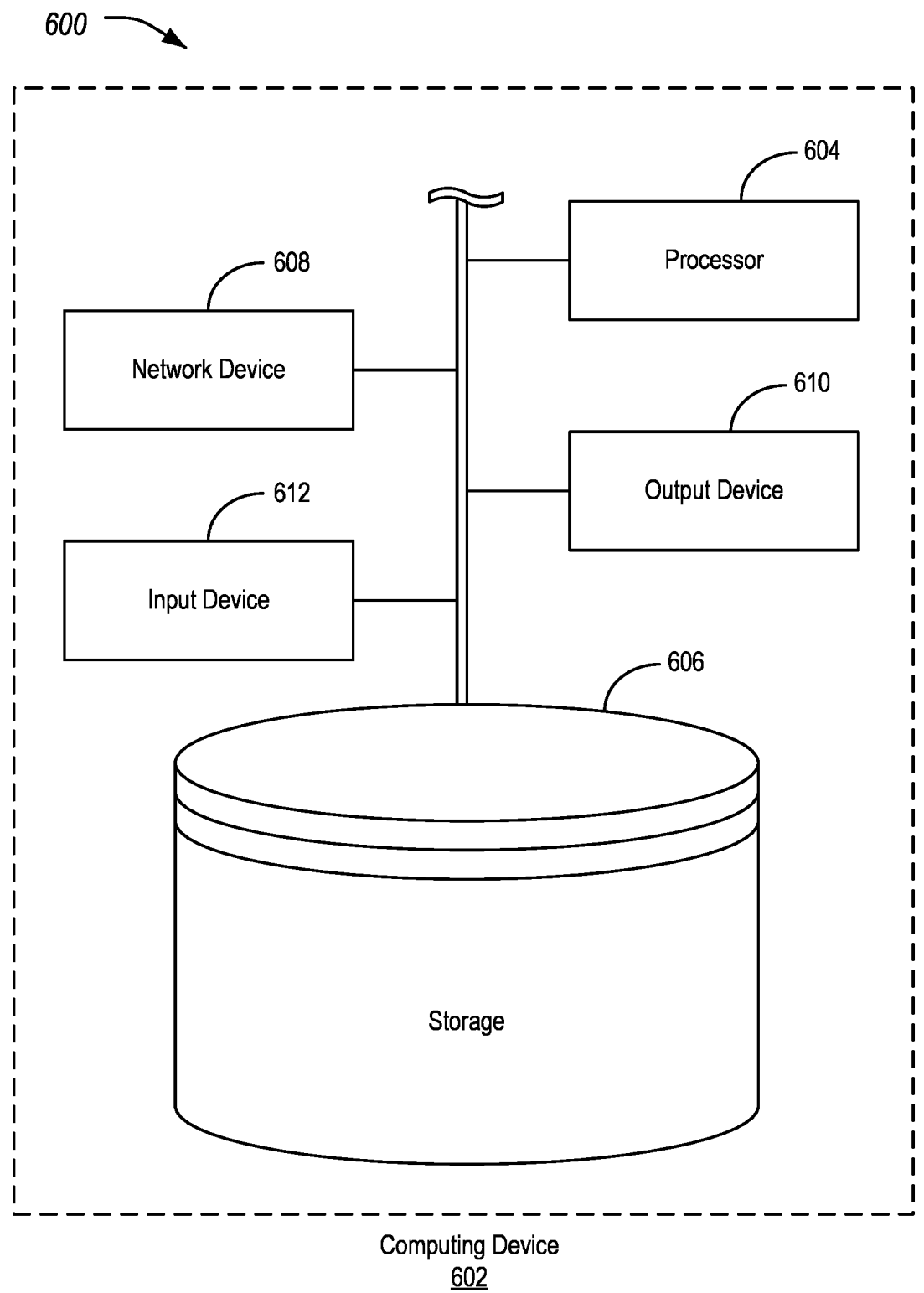
FIG. 6 illustrates an example computing device for communication of fluid specifications and fill capacities for vehicles for enhanced fluid filling.

FIG. 6 illustrates an example computing device 602 for communication of fluid specifications and fill capacities for vehicles 102 for enhanced fluid filling. Referring to FIG. 6, and with reference to FIGS. 1-5, the TCU 104, fluid sensor 110, exterior sensors 112, vehicle HMI 114, fluid dispensers 118, mobile devices 120, dispenser communicator 122, and dispenser HMI 124 may include examples of such computing devices 602. Computing devices 602 generally include computer-executable instructions, such as those of the fluid monitor 116, where the instructions may be executable by one or more computing devices 602. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as fluid requirements 108, indications of available fluids 126, indications of compatible fluids 202, indications of incompatible fluids 204, etc., may be stored and transmitted using a variety of computer-readable media.

As shown, the computing device 602 may include a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the vehicle fluid communication system 100.

The GPU may include hardware and software for display of at least two-dimensional (2D) and optionally three-dimensional (3D) graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices 612 that receive human interface inputs may include keyboards, mice, trackballs, touchscreens, microphones, graphics tablets, and the like.

The network devices 608 may each include any of various devices that enable the described components to send and/or receive data from external devices over networks. Examples of suitable network devices 608 include an Ethernet interface, a Wi-Fi transceiver, a cellular transceiver, or a BLUETOOTH or BLE transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for dispensing of available fluids for a vehicle, comprising:

receiving, to the vehicle from a fluid dispenser over a bidirectional filling communications session, information indicative of a plurality of available fluids for dispensing from the fluid dispenser into a fluid reservoir of the vehicle;

indicating, from the vehicle over the bidirectional filling communications session to the fluid dispenser, a desired quantity of a compatible fluid to be dispensed to the vehicle; and activating the fluid dispenser by sending a first command over the bidirectional filling communications session to begin dispensing the desired quantity of the compatible fluid into the fluid reservoir of the vehicle;

monitoring the dispensing using a fluid sensor of the vehicle to monitor a level of reservoir fluid in the fluid reservoir; and deactivating the fluid dispenser by sending a second command over the bidirectional filling communications session to discontinue the dispensing responsive to the level of the reservoir fluid indicating that the quantity of the compatible fluid has been dispensed.

2. The method of claim 1, further comprising:

identifying a filling issue responsive to the level of the reservoir fluid not increasing during the dispensing; and alerting the fluid dispenser to discontinue the dispensing of the compatible fluid by sending the second command over the bidirectional filling communications session responsive to the level of the reservoir fluid not increasing.

3. The method of claim 1, further comprising:

using an external sensor of the vehicle to monitor for fluid spillage; and alerting the fluid dispenser to discontinue the dispensing of the compatible fluid by sending the second command over the bidirectional filling communications session responsive to detecting the fluid spillage.

4. The method of claim 1, further comprising:

identifying a desired octane of fuel for the vehicle, the desired octane of fuel being between a first octane of a first fluid of the plurality of available fluids and a second octane of a second fluid of the plurality of available fluids; and computing a first quantity and a second quantity such that the first quantity divided by the second quantity times the first octane plus the second quantity divided by the first quantity times the second octane equals the desired octane, wherein the first quantity and the second quantity add up to a total desired quantity of the compatible fluid.

5. The method of claim 4, further comprising:

determining the total desired quantity of fluid to be dispensed based on a level of fill of the fluid reservoir as determined using a fluid sensor.

6. The method of claim 4, wherein a blend of the first fluid and the second fluid as the compatible fluid is determined to choose an octane level of at least a minimum required octane for the vehicle and to minimize total fuel spend.

7. The method of claim 1, further comprising illustrating, in a dispenser human machine interface (HMI), an indication that the fluid dispenser is providing the compatible fluid.

8. A system for dispensing of available fluids for a vehicle, comprising:

a vehicle configured to establish a bidirectional filling communications session between a controller of the vehicle and a dispenser communicator of a fluid dispenser, the vehicle executing a fluid monitor to perform operations including to:

receive, to the vehicle from the fluid dispenser over the bidirectional filling communications session, information indicative of a plurality of available fluids for dispensing from the fluid dispenser into a fluid reservoir of the vehicle;

indicate, from the vehicle over the bidirectional filling communications session to the fluid dispenser, a desired quantity of a compatible fluid to be dispensed to the vehicle;

activate the fluid dispenser by sending a first command over the bidirectional filling communications session to begin dispensing the desired quantity of the compatible fluid into the fluid reservoir of the vehicle;

monitor the dispensing using a fluid sensor of the vehicle to monitor a level of reservoir fluid in the fluid reservoir; and deactivate the fluid dispenser by sending a second command over the bidirectional filling communications session to discontinue the dispensing responsive to the level of the reservoir fluid indicating that the quantity of the compatible fluid has been dispensed.

9. The system of claim 8, wherein the fluid monitor is further configured to perform operations including to:

identify a filling issue responsive to the level of the reservoir fluid not increasing during the dispensing; and alert the fluid dispenser to discontinue the dispensing of the compatible fluid by sending the second command over the bidirectional filling communications session responsive to the level of the reservoir fluid not increasing.

10. The system of claim 8, wherein the fluid monitor is further configured to perform operations including to:

use an external sensor of the vehicle to monitor for fluid spillage; and alert the fluid dispenser to discontinue the dispensing of the compatible fluid by sending the second command over the bidirectional filling communications session responsive to detecting the fluid spillage.

11. The system of claim 8, wherein the fluid monitor is further configured to perform operations including to:

identify a desired octane of fuel for the vehicle, the desired octane of fuel being between a first octane of a first fluid of the plurality of available fluids and a second octane of a second fluid of the plurality of available fluids; and compute a first quantity and a second quantity such that the first quantity divided by the second quantity times the first octane plus the second quantity divided by the first quantity times the second octane equals the desired octane, wherein the first quantity and the second quantity add up to a total desired quantity of the compatible fluid.

12. The system of claim 11, wherein the fluid monitor is further configured to perform operations including to:

determine the total desired quantity of fluid to be dispensed based on a level of fill of the fluid reservoir as determined using a fluid sensor.

13. The system of claim 8, wherein a blend of the first fluid and the second fluid as the compatible fluid is determined to choose an octane level of at least a minimum required octane for the vehicle and to minimize total fuel spend.

14. The system of claim 8, wherein the fluid dispenser is configured to illustrate in a dispenser HMI, an indication that the fluid dispenser is providing the compatible fluid.

15. The system of claim 8, wherein the external sensor of the vehicle is a camera.

16. A non-transitory computer-readable medium comprising instructions for dispensing of available fluids for a vehicle that, when executed by one or more controllers of the vehicle, cause the vehicle to perform operations including to:

establish a bidirectional filling communications session between a one or more controllers of the vehicle and a dispenser communicator of a fluid dispenser;

receive, to the vehicle from the fluid dispenser over the bidirectional filling communications session, information indicative of a plurality of available fluids for dispensing from the fluid dispenser into a fluid reservoir of the vehicle;

indicate, from the vehicle over the bidirectional filling communications session to the fluid dispenser, a desired quantity of a compatible fluid to be dispensed to the vehicle; and activate the fluid dispenser by sending a first command over the bidirectional filling communications session to begin dispensing the desired quantity of the compatible fluid into the fluid reservoir of the vehicle;

monitor the dispensing using a fluid sensor of the vehicle to monitor a level of reservoir fluid in the fluid reservoir; and deactivate the fluid dispenser by sending a second command over the bidirectional filling communications session to discontinue the dispensing responsive to the level of the reservoir fluid indicating that the quantity of the compatible fluid has been dispensed.

17. The non-transitory computer-readable medium of claim 16, further comprising instructions that, when executed by the one or more controllers of the vehicle, cause the vehicle to perform operations including to:

identify a filling issue responsive to the level of the reservoir fluid not increasing during the dispensing; and alert the fluid dispenser to discontinue the dispensing of the compatible fluid by sending the second command over the bidirectional filling communications session responsive to the level of the reservoir fluid not increasing.

18. The non-transitory computer-readable medium of claim 16, further comprising instructions that, when executed by the one or more controllers of the vehicle, cause the vehicle to perform operations including to:

use an external sensor of the vehicle to monitor for fuel spillage; and alert the fluid dispenser to discontinue the dispensing of the compatible fluid by sending the second command over the bidirectional filling communications session responsive to detecting fuel spillage.

19. The non-transitory computer-readable medium of claim 16, further comprising instructions that, when executed by the one or more controllers of the vehicle, cause the vehicle to perform operations including to:

identify a desired octane of fuel for the vehicle, the desired octane of fuel being between a first octane of a first fluid of the plurality of available fluids and a second octane of a second fluid of the plurality of available fluids; and compute a first quantity and a second quantity such that the first quantity divided by the second quantity times the first octane plus the second quantity divided by the first quantity times the second octane equals the desired octane, wherein the first quantity and the second quantity add up to a total desired quantity of the compatible fluid.

20. The non-transitory computer-readable medium of claim 19, further comprising instructions that, when executed by the one or more controllers of the vehicle, cause the vehicle to perform operations including to:

determine the total desired quantity of fluid to be dispensed based on a level of fill of the fluid reservoir as determined using a fluid sensor.

21. The non-transitory computer-readable medium of claim 16, wherein a blend of the first fluid and the second fluid as the compatible fluid is determined to choose an octane level of at least a minimum required octane for the vehicle and to minimize total fuel spend.

\* \* \* \* \*